INVENTOR.
BRUCE A. HAINSWORTH
BY
Oberlin + Limbach
ATTORNEYS.

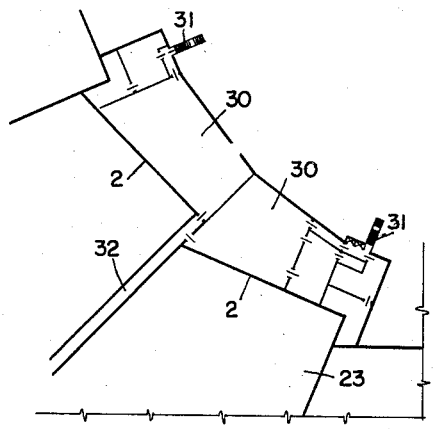
Fig. 5
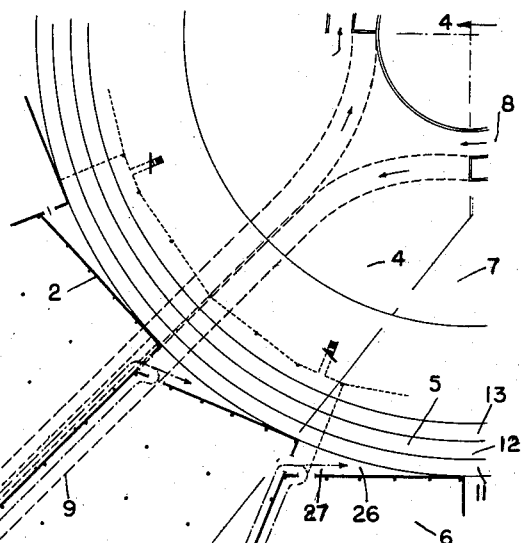
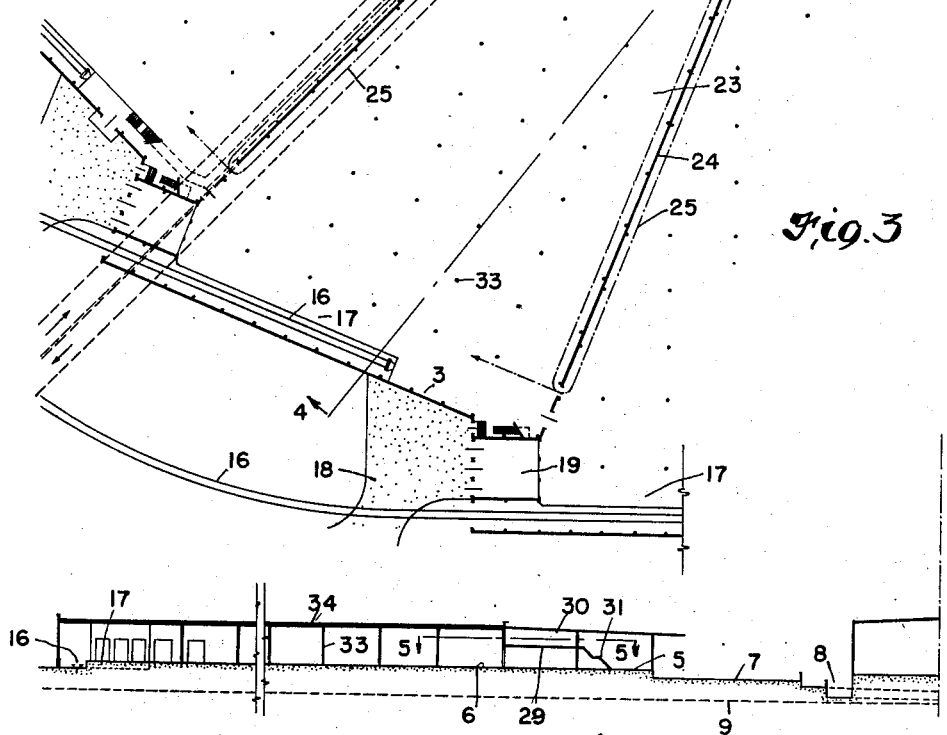
Fig. 3
Fig. 4
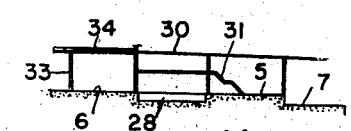
Fig. 6
INVENTOR.
BRUCE A. HAINSWORTH
BY
Oberlin & Limbach
ATTORNEYS.

Patented June 16, 1953

2,642,197

UNITED STATES PATENT OFFICE 2,642,197

FREIGHT HANDLING SYSTEM

Bruce A. Hainsworth, Shaker Heights, Ohio, assignor to The H. K. Ferguson Company, Cleveland, Ohio, a corporation of Ohio Application October 15, 1947, Serial No. 779,938

2 Claims. (Cl. 214—16)

The present invention relates generally, as indicated, to a freight handling system, and more especially to unique layouts of freight terminals as in the case of warehouses, manufacturing and assembly plants or the like, for greatly facilitating the flow or movement of goods thereinto and therefrom.

One of the disadvantages in conventional layouts of such freight terminals is that because the generally inadequate loading and unloading platform facilities are not equi-distant from the storage or manufacturing areas the transportation of goods to and from such platforms and remote portions of the building becomes a major factor involving considerable time and expense, not to say anything about inconvenience and congestion of inbound and outbound traffic.

Accordingly, it is one primary object of this invention to provide a unique freight handling system having a maximum useful area and adequate loading and unloading platform facilities so arranged that all portions of such area are substantially equi-distant from the platform facilities and that congestion of inbound and outbound traffic is reduced to a minimum whereby to greatly facilitate the flow of goods to and from selected portions of such area.

A further object is to provide in a freight terminal a central court area to which goods to be shipped converge from a building thereabout whereby to reduce materially the amount of travel of the goods to a small fractional portion, as compared with that encountered in conventionally designed buildings.

A further object is to provide a freight terminal in which the area within the building is of generally annular or ring-like form bounded exteriorly by curved roadways communicating by separate branches with selected points on the periphery of the building whereby incoming goods may be conveniently unloaded at such selected points for use or storage within the building, followed by movement of stored or processed goods from within different portions of the building in a generally radial inward direction to a central shipping or loading area, there being other separate roadways associated with such loading area.

A still further object is to provide a freight terminal as aforesaid, wherein the inbound and outbound roadways cross one another at different levels whereby to further avoid the possibility of congestion.

A still further object is to provide a freight terminal in which a central court or shipping area is provided with a movable annular floor onto which radially inwardly moved goods from the storage or processing area thereabout are deposited for transportation to and collection at any desired point of shipping.

A still further object is to provide a freight terminal of annular form which is divided by radially disposed walls into a plurality of segmental units each provided with loading and unloading platforms at its inner and outer walls whereby movement of goods may most conveniently be radially inward, the platform associated with the inner wall of one of such units being common to the platform associated with the inner walls of all of the other units.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings—

Fig. 3 is an enlarged fragmentary plan view of the construction of Fig. 1;

Fig. 4 is a radial cross section view of the construction of Figs. 1 and 3 taken substantially along line 4—4, Fig. 3;

Fig. 5 is a horizontal cross section view taken substantially along line 5—5, Fig. 4; and Fig. 6 is a fragmentary radial cross section view similar to that of Fig. 4 except illustrating a modified construction with a movable annular floor area associated with the central court area.

Figure 1:
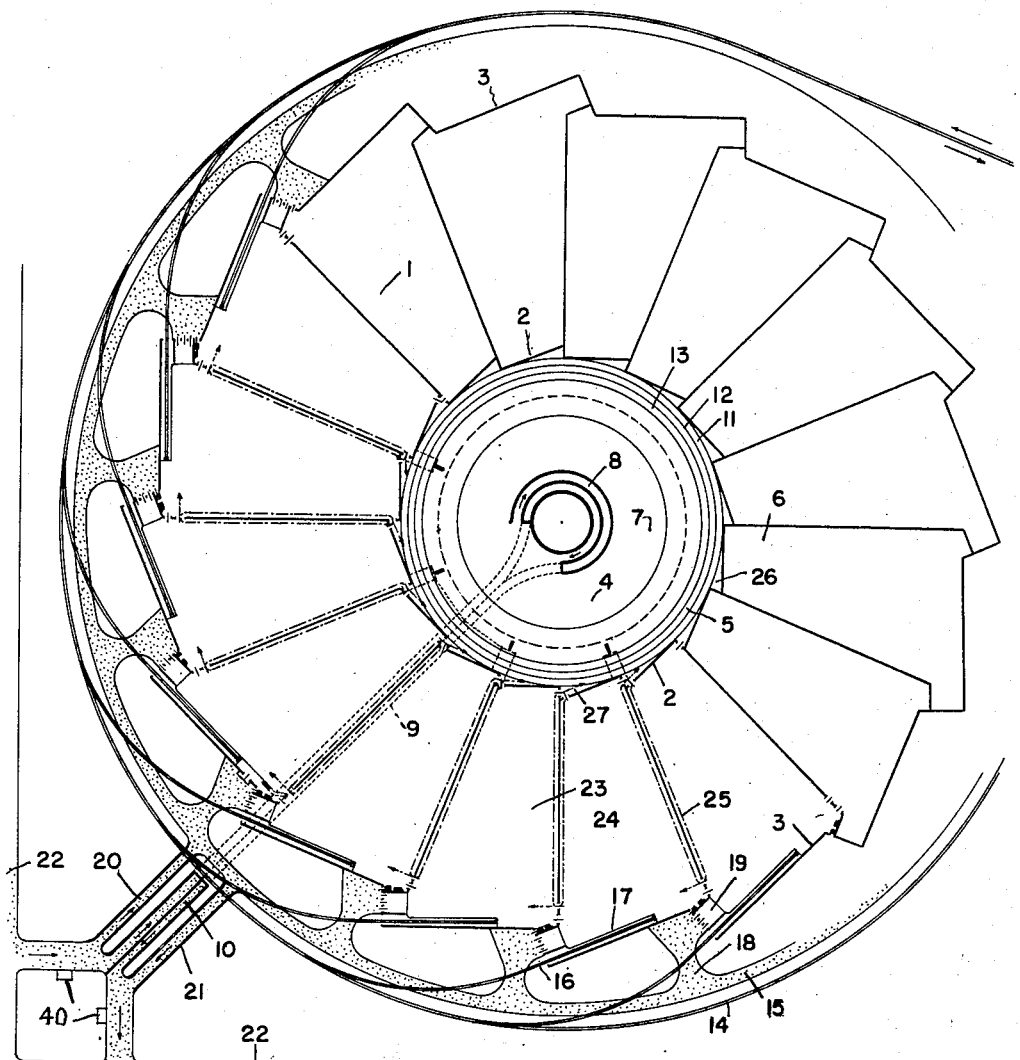
Fig. 1 is a top plan view, with the roof removed, of one form of freight terminal constituting the present invention.

Referring now to the freight terminals illustrated in the drawing, and first to that illustrated in Figs. 1, 3, 4, and 5, the numeral 1 generally designates a building (roof removed in Figs. 1 and 3) laid out to cover an annular area of generally circular ring shape between its inner and outer walls 2 and 3 respectively. Such walls 2 and 3 are, for a purpose which will appear later, preferably straight-line elements which form inner and outer peripheries each generally resembling that of a circular saw in plan view.

Within inner wall 2 is a central court area 4 provided with an outer annular band 5 at a level substantially corresponding with that of the floor 6 of the building, and an intermediate band 7 disposed at a convenient level (about 3′ 9″ or thereabout) below band 5 to enable loading of goods from band 5 directly onto trailers or trucks parked radially on band 7, said band 7 being of sufficient radial width to provide both parking and travel areas for trucks and trailers thereon. Within band 7 is an inclined ramp system 8 providing separate one-way roadways leading from band 7 to a tunnel 9 disposed radially under said building, said tunnel at its outer end connecting with other inclined ramps 10 disposed exteriorly of the building. The outer portion of band 5 which is abutted by the inner wall 2 of the building is divided into three lanes 11, 12, and 13 to channelize movement of goods as will hereinafter appear.

Encircling said building are concentric circular roadways 14 and 15 respectively, comprising a railroad track and a truck and trailer roadway. Said railroad track 14 has sidings 16 leading therefrom to circumferentially spaced loading and unloading platform areas 17 of the building, each of such areas 17 accommodating several railroad cars which may be left thereadjacent for loading or unloading, as desired. Said areas 17, as best illustrated in Fig. 4, are elevated relative to the sidings 16 for enabling convenient movement of goods to and from the railroad cars and dock areas.

Said roadway 15 is likewise provided with inwardly-extending branches 18 leading to circumferentially spaced platform areas 19 on the building, each of which is capable of accommodating several trucks and trailers primarily for unloading or receiving purposes. Ingress and egress to and from said roadway 15 is provided as by separate radial branch roadways 20 and 21 leading from the main highways 22 there being provided gate houses 40 on said branches 20 and 21 whereby vehicles delivering or picking up goods may be directed to a proper platform area or to the platform area adjacent a proper one in the event that such proper one is fully occupied. The arrangement is preferably, as shown, such that inbound vehicles may either pass directly to roadway 15 by way of branch 20 or directly to the central court area 4 by way of ramps 10 and tunnel 9. Likewise, outbound vehicles from tunnel 9 and roadway 15 merge in the branch roadway 21 travelling outward in the same direction. Thus the entire roadway system may be coordinated whereby traffic is only in one direction on each roadway for facilitating travel and avoiding congestion.

Referring again to building 1 the same is divided into adjacent generally segmental units 23 by radially disposed walls 24 there being platform areas 17 and 19 associated with each unit whereby goods received from railroad cars on sidings 16, and trucks and trailers on branches 18 may be transported to a desired point within each unit 23 for storage or processing. To assist such transportation overhead tram-rails 25, or the like, encircling the walls 24 are provided, said tram-rails having means thereon (not shown) which enable hooking on of carts or trucks for radial inward movement within each unit to a desired place where the carts or trucks may be unhooked. If desired the carts or trucks filled at the platform areas 17 and 19 may be towed other than by the tram-rails 25 to a convenient place of storage or processing. For shipping goods from within units 23 trucks therein are loaded and connected to said tram-rails for radial inward movement to the central court area 4, said tram-rails being preferably provided with means for automatically releasing such trucks at both ends of the walls 24 whereby loaded trucks are disconnected at the inner ends of the walls 24 and empty trucks hooked onto the tram-rails at the inner ends of such walls or at some intermediate point are disconnected at the outer ends of such walls. To prevent piling up and interference of successive carts or trucks with one another the triangular areas 26 are inclined slightly downward toward the central court area 4 whereby when such trucks are released by tram-rails 25 they will move downwardly along such areas 26 in the direction indicated by the arrows 27 onto the outer lane 11 of band 5. Such outer lane 11 is reserved for the make-up of tractor-pulled trains of such trucks. The middle lane 12 is reserved for the travel of such tractor trains to any desired shipping point and the inside lane 13 is reserved for unloading of the contents of the trucks into the radially parked trucks and trailers on band 7 abutting the band 5. Such channelized transportation of individual trucks from the segmental units 23 avoids congestion and resulting confusion whereby shipment of goods may be smoothly and swiftly accomplished.

In a modified form of construction as shown in Fig. 6 the lanes 11, 12, and 13 are replaced by a moving annular floor 28, the trucks moving down the triangular areas 26 alighting on said floor 28 for transportation to a selected point of shipping, at which the trucks are removed from the moving floor.

The fragmentary view of Fig. 5 illustrates a construction in which a drop ceiling 29 provides a floor for offices 30 or the like accessible as by stairways 31 from band 5 or a corridor 32 extending radially outward along walls 24 to the outer peripheral portion of the building where other offices may be provided. Such offices 30 are desirable, for example, for coordinating receiving and shipping activity.

When the building 1 is used as a warehouse, for example, the flow of goods from receiving to shipping is briefly as follows:

Loaded railroad cars and inbound trucks and trailers are spotted at an unloading station most convenient to the place of storage, it being noted that each segmental unit 23 is conveniently accessible from the platform areas, 17 and 19, that is those associated with each unit and the two adjoining units. The goods received are placed on a platform truck or the like for movement as by suitable tractors to a desired place within a selected unit 23, such trucks being unloaded by any conventional means. To recover the goods from storage for shipment, empty trucks are loaded and transported to the nearest tram-rail 25 for carriage to the central court area 4 whereat, as previously described, the trucks from various units are carried to and assembled at a selected shipping point.

As a matter of general interest and for comparative purposes with conventional building constructions, a circular construction as just described with a net warehouse area of one million square feet and comprising sixteen segmental units, has receiving platform facilities for forty-eight trucks and forty-eight railroad cars, and shipping platform facilities for eighty trucks, thus enabling the handling of about 136,000 cubic feet of goods. With such circular construction a saving of some 400 miles per day is effected on the loading platforms, as compared with a conventional rectangular warehouse of comparable size, this saving in percentage being about 75%.

In Figs. 3 and 4 the dots and double lines 33 indicate posts or pillars for supporting a roof 34 over the entire structure. While the freight terminal illustrated constitutes but one story it will be obvious that in some cases it may be desirable to construct a multi-story building in which case goods will be received in the upper stories by means of elevators and shipped from such upper stories as by chutes leading down to the central court area 4.

It is further to be understood that the aforedescribed construction may initially be built to semi-circular or other intermediate form and then conveniently added to by adding further segmental units as space requirements increase and correspondingly extending the roadway loops 14 and 15 as needed. Likewise, instead of providing a tunnel 9 it may in some cases be preferred to elevate the outbound roadway above the building or to simply provide a corridor between adjacent segmental units 23 for such roadway and then providing bridges and underpasses at the intersection of such roadway with the roadways 14 and 15.

Figure 2:
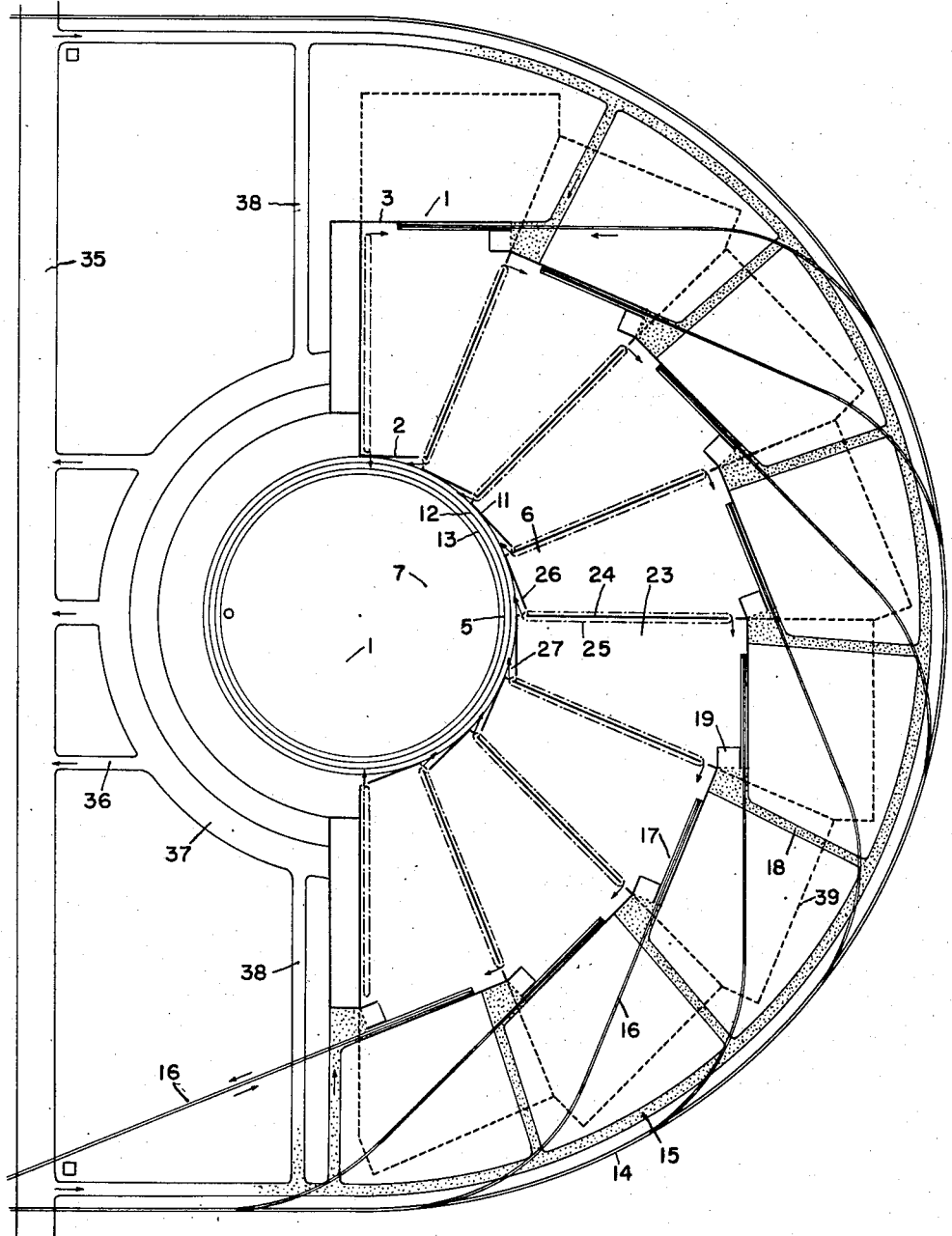
Fig. 2 is a top plan view, with the roof removed, of another form of freight terminal, this construction being such that it may be conveniently added to as space requirements increase.

In the building construction illustrated in Fig. 2 elements thereof which are the same or similar to those in the constructions of Figs. 1, 3, 4, 5, and 6 have been indicated by the same numerals and further description of such similar elements need not now be repeated.

As shown in Fig. 2, the building 1 is of generally semi-annular form with roadways 14 and 15 thereabout. In this construction further expansion is provided for by having the roadways 14 and 15 radially spaced from the outer wall 3 of the building to permit radial expansion of the units 23 to the dotted lines 39 accompanied by re-location of the sidings 16 and the branches 18. Otherwise the flow of goods into and from the units 23 between the platform areas 17 and 19 and the central court area 4 are the same as described in relation to Figs. 1, 3, 4, and 5. One principal difference, however, is that no tunnel 9 or elevated roadway or the like is required because the inbound and outbound traffic does not cross, there being access to roadway 15 at the opposite ends thereof from a main highway 35 and access to the court area 4 by way of branches 38 leading from roadway 15 to a semi-circular roadway 37 surrounding the court area 4. Branching from the roadway 37 are a plurality of egress roadways 36 joining into the main highway 35.

The dimensions of the afore-described building constructions are partly controlled by the minimum feasible circular switching of railroad tracks and, of course, the central court area must be large enough to accommodate the assembly and shipping platform facilities and provide for the parking and travelling of trucks and trailers. Of course a number of different factors are determinative of the required warehouse area, viz. the types of goods handled, the rate of turn-over of such goods, the method of receiving the goods, the number of warehouse operations to be performed, the types of orders handled, that is whether wholesale or retail, and the method of shipping the goods. All of such factors, of course, determine the size of the warehouse and the platform facilities required.

By way of summary it is now clear that with building constructions such as disclosed maximum areas are provided with adequate loading and unloading platform facilities whereby receiving and shipping operations can be carried out with minimum transportation and maximum economy and without creating any congestion due to inbound and outbound traffic.

In the above description of the freight terminals herein disclosed the reference to the use thereof for warehouses and the like is to be regarded as merely exemplary inasmuch as such buildings obviously have utility as manufacturing or assembly plants wherein the materials are conveyed from one segmental unit to another for ultimate transportation to a pre-selected platform area. Likewise, it is to be understood that in some instances it may be desirable to reverse the flow of goods from that described, that is the goods may be received at the central court area wherefrom they are transported radially outward into the desired segmental units and then shipped from the segmental units radially outward to the desired platform areas 17 and 19.

Other modes of applying the principle of the invention may be employed, change being made as regards the details described, provided the features stated in any of the following claims, or the equivalent of such, be employed.

I therefore particularly point out and distinctly claim as my invention:

1. In a freight terminal and transfer system, the combination of a generally annular building for storage of goods, a railroad track and a motor truck roadway disposed concentrically around said building, alternate sidings and branch roadways leading from said track and roadway respectively to circumferentially spaced points around said building, said building at such circumferentially spaced points therearound having two series of platforms to which said sidings and branch roadways respectively lead and which are elevated with respect to the respective sidings and branch roadways, said building also having an annular platform around its inner periphery which is elevated with respect to the area bounded thereby, a tunnel under said building, track, and roadway providing a separate motor truck roadway which surfaces at the outer end of said tunnel at a point outward beyond said track and said motor truck roadway, a helical ramp system leading from the inner end of said tunnel to such area, and an annular driveway in such area defined by said annular platform and the periphery of said ramp system for travel of trucks and trailers thereon and for backing up of the trucks and trailers against said annular platform at any desired points around the inner periphery of said annular platform.

2. The freight terminal and transfer system according to claim 1 characterized further in that said annular platform includes an annular rotating portion onto which outgoing goods from the building are adapted to be loaded for transportation to a desired location around said platform.

BRUCE A. HAINSWORTH.

(References on following page)

References Cited in the file of this patent

UNITED STATES PATENTS

| Number | Name | Date |
|---|---|---|
| 517,110 | Millar | Mar. 27, 1894 |
| 1,275,145 | Fitch | Aug. 6, 1918 |
| 1,280,144 | Bonner | Oct. 1, 1918 |
| 1,432,131 | Sturges | Oct. 17, 1922 |
| 1,480,137 | Allin | Jan. 8, 1924 |
| 1,577,184 | Fitch | Mar. 16, 1926 |
| 1,577,185 | Fitch | Mar. 16, 1926 |
| 1,628,935 | Turner et al. | May 17, 1927 |
| 1,697,598 | Hewes | Jan. 1, 1929 |
| 1,789,436 | Hegel | Jan. 20, 1931 |
| 2,096,958 | Clerc | Jan. 14, 1935 |

FOREIGN PATENTS

| Number | Country | Date |
|---|---|---|
| 45,940 | Holland | 1939 |

OTHER REFERENCES

Railroad Gazette, July 29, 1898, volume 30, page 544.

Railroad Gazette, Mar. 23, 1907, volume 42, page 404.

Engineering News, Nov. 4, 1915, page 875.